（12）United States Patent
Wiedemann

(10) Patent No.: US 10,787,054 B2
(45) Date of Patent: Sep. 29, 2020

(54) MOTOR VEHICLE

(71) Applicant: Bayerische Motoren Werke Aktiengesellschaft, Munich (DE)

(72) Inventor: Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 40 days.

(21) Appl. No.: 15/581,760

(22) Filed: Apr. 28, 2017

(65) Prior Publication Data

US 2017/0232818 A1 Aug. 17, 2017

Related U.S. Application Data

(63) Continuation of application No. PCT/EP2015/073972, filed on Oct. 16, 2015.

(30) Foreign Application Priority Data

Oct. 30, 2014 (DE) ...................... 10 2014 222 139

(51) Int. Cl.
*B60H 1/00* (2006.01)

(52) U.S. Cl.
CPC ..... *B60H 1/00742* (2013.01); *B60H 1/00028* (2013.01); *B60H 1/00864* (2013.01);
(Continued)

(58) Field of Classification Search
CPC ............ B60H 1/00742; B60H 1/00864; B60H 1/00028; B60H 2001/00185; B60H 2001/00235
(Continued)

(56) References Cited

U.S. PATENT DOCUMENTS 2,162,439 A    6/1939   Lintern et al.
4,890,544 A *   1/1990   Aalto ........................ F24F 9/00
                                                             454/297
(Continued)

FOREIGN PATENT DOCUMENTS

DE        2 318 097 A      10/1974
DE    199 48 223 A1    4/2001
(Continued)

OTHER PUBLICATIONS

German Search Report issued in counterpart German Application DE 10 2014 222 139.0 dated May 18, 2015 with partial English translation (twelve (12) pages).
(Continued)

*Primary Examiner* — Vivek K Shirsat
*Assistant Examiner* — Ko-Wei Lin
(74) *Attorney, Agent, or Firm* — Crowell & Moring LLP

(57) ABSTRACT

In order to provide a motor vehicle, the roof of which is composed of a transparent material at least in some sections, wherein persons located in the motor vehicle are cooled by means of escaping air, air outlet openings are formed on both sides on opposite roof frame longitudinal segments, in each case in accordance with the number of seat rows. Air lines are provided, which convey air conditioned by at least one present air conditioning system to at least one air outlet opening. Sensors that detect occupancy of the present seats by a person are provided, and a controller for the present air conditioning system is provided, which adjusts an air conditioning system from the number of present air conditioning systems in such a way that an air flow having a predetermined temperature and having a predetermined air outlet speed is applied to an upper region of a person located on a seat.

16 Claims, 4 Drawing Sheets

(52) U.S. Cl.
CPC .............. *B60H 2001/00185* (2013.01); *B60H 2001/00235* (2013.01)

(58) Field of Classification Search
USPC .... 454/70, 75, 139, 140, 143, 145, 152, 155
See application file for complete search history.

(56) References Cited

U.S. PATENT DOCUMENTS

| | | | | |
|---|---|---|---|---|
| 6,102,792 | A * | 8/2000 | Nystrom | F24F 13/04 454/266 |
| 6,386,965 | B1 * | 5/2002 | Greenwald | B60H 1/00742 165/41 |
| 7,247,088 | B2 * | 7/2007 | Sogame | B60H 1/00407 454/124 |
| 2006/0116067 | A1 * | 6/2006 | Federspiel | F24F 11/0001 454/256 |
| 2012/0003911 | A1 * | 1/2012 | Geiss | B60H 1/00378 454/143 |
| 2012/0238197 | A1 * | 9/2012 | Katagiri | B60H 1/00842 454/152 |
| 2012/0312520 | A1 | 12/2012 | Hoke et al. | |
| 2013/0037252 | A1 | 2/2013 | Major et al. | |
| 2013/0092364 | A1 * | 4/2013 | Kumar | B60H 1/00742 165/237 |
| 2013/0196586 | A1 * | 8/2013 | Hoke | B60H 1/241 454/127 |
| 2013/0207420 | A1 * | 8/2013 | Kumar | B62D 25/06 296/217 |
| 2014/0244106 | A1 | 8/2014 | Singer et al. | |

FOREIGN PATENT DOCUMENTS

| | | | |
|---|---|---|---|
| DE | 101 10 191 | A1 | 9/2002 |
| DE | 10110191 | * | 9/2002 |
| DE | 102 55 803 | B3 | 5/2004 |
| DE | 10 2012 214 066 | A1 | 2/2013 |
| DE | 10 2012 019 280 | A1 | 3/2013 |
| EP | 2 719 560 | A1 | 4/2014 |

OTHER PUBLICATIONS

International Search Report (PCT/ISA/210) issued in PCT Application No. PCT/EP2015/073972 dated Jan. 21, 2016 with English translation (seven (7) pages).
German-language Written Opinion (PCT/ISA/237) issued in PCT Application No. PCT/EP2015/073972 dated Jan. 21, 2016 (six (6) pages).
Chinese-language Office Action issued in counterpart Chinese Application No. 201580057917.8 dated Oct. 31, 2018 with English translation (15 pages).

* cited by examiner

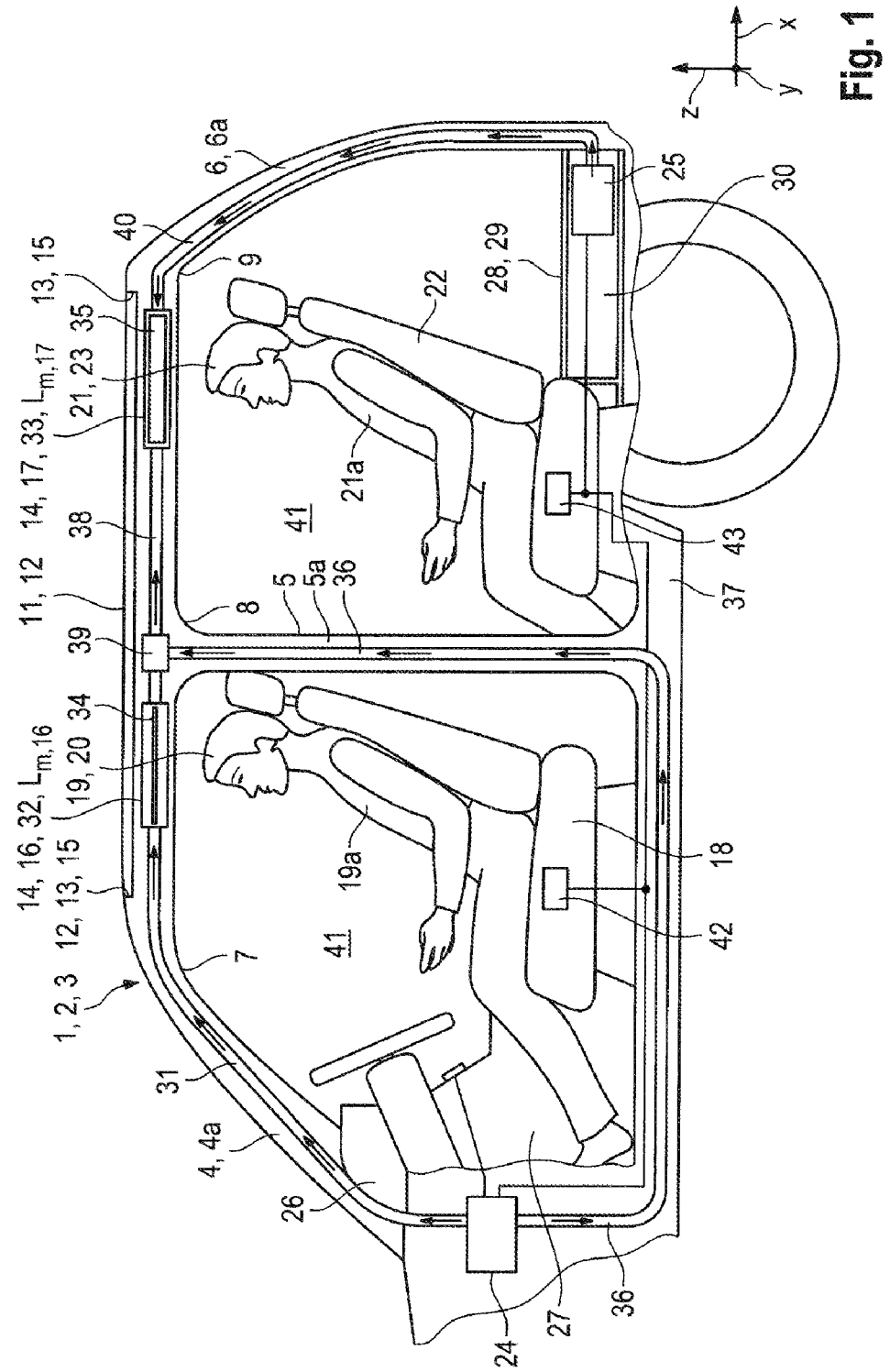

MOTOR VEHICLE

CROSS REFERENCE TO RELATED APPLICATIONS

This application is a continuation of PCT International Application No. PCT/EP2015/073972, filed Oct. 16, 2015, which claims priority under 35 U.S.C. § 119 from German Patent Application No. 10 2014 222 139.0, filed Oct. 30, 2014, the entire disclosures of which are herein expressly incorporated by reference.

BACKGROUND AND SUMMARY OF THE INVENTION

The invention relates to a motor vehicle having a body which forms a passenger cell, the body having a roof, a floor and body pillars. The body pillars connect the roof to the floor, the roof having a roof opening which is surrounded by roof frame portions. The roof opening is filled with a roof portion of a transparent material. At least one air delivery system is provided which delivers air into a vehicle interior from the surroundings or, where appropriate, from at least one air-conditioning system.

DE 199 48 223 A1 discloses a motor vehicle in which an air flow duct is formed in a cavity of a body A pillar. It is possible through an appropriate structural design for the respective front pillar or body A pillar to have a flat nozzle which extends along the respective lateral edge of the front window. The air flowing out of the flat nozzle allows the front window to be kept free of moisture condensation.

DE-A 23 18 097 discloses forming outflow arrangements on the body A pillar and additionally on the roof frame, with the result that the side windows of a vehicle are also freed of moisture condensation by means of the outflowing air.

Also known are motor vehicles which have a sliding roof made of a transparent material. Motor vehicles are also known in which the roof or a roof region are formed of a transparent material. However, in the case of a roof made up of a transparent material, solar radiation gives rise to a considerable input of heat in the vehicle interior and thus also to considerable heating of the vehicle occupants located in the vehicle interior.

It is the object of the invention to provide a motor vehicle of which the roof consists at least in certain portions of a transparent material, with cooling of the persons located in the motor vehicle being obtained by means of outflowing air.

This and other objects are achieved by a motor vehicle according to the invention having a body which forms a passenger cell. The body has a roof, a floor and body pillars, the body pillars connecting the roof to the floor. The roof has a roof opening which is surrounded by roof frame portions. The roof opening is filled by a roof portion of a transparent material. At least one air delivery system is provided which delivers air into a vehicle interior from the surroundings or, where appropriate, from at least one air-conditioning system for generating conditioned air.

Air outflow openings are advantageously formed on both sides on opposite roof frame longitudinal portions, in each case corresponding to the number of seat rows. There are further provided air lines which delivers air from at least one present air delivery system to at least one air outflow opening. Also provided are systems which detect seat occupancy of the present seats by a person.

A controller for the air delivery system is provided which adjusts the respective air delivery system of the present number of air delivery systems such that an air flow having a predetermined air outflow velocity and having a temperature which corresponds to the temperature of the surrounding air (or, in the presence of at least one air-conditioning system, corresponds to a selectable, cooled temperature) is applied to an upper region of a person located on a seat.

In an advantageous embodiment, the air outflow velocity is set in such a way that the air which trickles down onto a head and/or an upper body of a person located on a seat has a velocity of 0.1 m/s with a tolerance range of ±10%.

One fan or, in an advantageous embodiment, two fans is/are advantageously provided for delivering the air volume flow.

The air outflow openings are advantageously formed in a housing, the respective housing being provided in the respective roof frame longitudinal portion. At least one air-guiding element is arranged in the respective housing so as to be pivotable by way of a controllable drive.

In an advantageous embodiment, with the arrangement of only one fan for delivering the air volume flow, adjustable throttling devices are provided by which the respective air volume which exits the respective air outflow opening can be set.

When only one fan is used and only one seat is occupied by a person, and by use of the respective adjustable throttling device in the two opposite air outflow openings concerned, a different air volume flow corresponding to the different spacing advantageously exits the corresponding opposite air outflow openings in such a way that a descending total air volume flow results directly over the head and/or an upper body of the person.

When the two seats below the corresponding air outlet opening are occupied, in each case an equal air volume advantageously flows out of the respective air outflow openings. The respective air volume is set by a corresponding setting of the respective air-guiding element and/or of the air outflow velocity in such a way that the respective air volume in each case descends directly over a head and/or an upper body of the respective person located on a seat with a velocity of at most 0.1 m/s with a tolerance range of ±10%.

In an advantageous embodiment, the respective air-guiding element deflects the outflowing air volume in the direction of the roof in such a way that the air volume in each case descends directly over the head and/or the upper body of the person located on the seat with a velocity of at most 0.1 m/s with a tolerance range of ±10%.

In an advantageous embodiment, the system for detecting occupancy of a seat includes pressure sensors and/or a seat-belt buckle detector.

It is advantageously possible with the invention to provide a motor vehicle in which, even when an upper region of persons sitting in the motor vehicle is exposed to a high amount of heat input, comfortable cooling of the persons can be achieved at their most affected regions, such as the head and upper body.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a longitudinal section view of a basic illustration of an interior of a motor vehicle, which illustrates the arrangement of air outflow nozzles in the roof frame level with the front seats and the rear seats.

DETAILED DESCRIPTION OF THE DRAWINGS

Figure 2A:
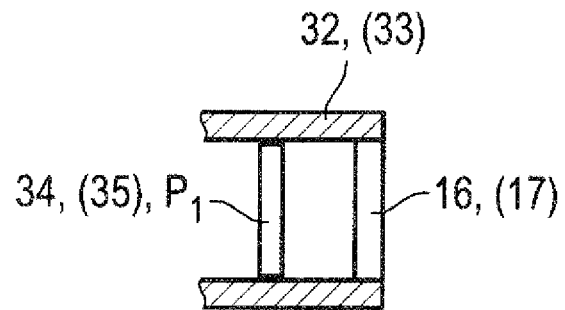
FIG. 2A shows a first position of an air-guiding element which closes the respective air outlet opening.

FIG. 1 shows a basic illustration of a motor vehicle 1 in a longitudinal section. The motor vehicle has a body 2 which forms a passenger cell 3. The body 2 has, among other things, on both vehicle sides in each case a front body pillar or A pillar 4, a central body pillar or B pillar 5, and a rear body pillar or C pillar 6, spaced from one another.

The respective two A pillars 4, B pillars 5 and C pillars 6 are connected to one another (integrally) at their upper ends 7, 8, 9 via a roof frame longitudinal portion 14 extending in the vehicle longitudinal direction x. In the embodiment shown, a roof 11 of the motor vehicle 1 has a body roof opening 13 in which a roof portion 12 made of a transparent material, such as glass or plastic, is provided.

The body roof opening 13 is formed by two opposite roof frame longitudinal portions 14 which extend in the vehicle longitudinal direction x and are spaced apart in the vehicle transverse direction y and by two roof frame transverse portions 15 which extend in the vehicle transverse direction y and are spaced apart in the vehicle longitudinal direction x.

In the embodiment shown in FIG. 1, two air outflow openings 16, 17 are formed in one roof frame longitudinal portion 14 on one side of the motor vehicle 1. The front air outflow opening 16 is provided level with front seats 18 such that, within an adjustment range of the respective front seat 18, an air volume flow $L_{m,16}$ can flow onto a head 19 and an upper body 19a of a person 20 located on the respective front seat 18.

The rear air outflow opening 17 as viewed in the vehicle longitudinal direction x is formed in the roof frame longitudinal portion 14 in terms of its length and orientation in such a way that a head 21 and an upper body 21a of a person 23 located on a rear seat bench or a rear individual seat 22 can be impinged by an air volume flow $L_{m,17}$ flowing out of the air outflow opening 17.

In the embodiment shown in FIG. 1, the supply or control of the air outflow openings 16, 17 with air is achieved by way of two air delivery systems 24, 25 which deliver air into a vehicle interior 41 from the surroundings or, where appropriate, from at least one air-conditioning system for generating conditioned air.

The two air delivery systems 24, 25 are typically two air-conditioning systems 24, 25 which deliver conditioned, i.e. cooled, air to the air outflow openings 16, 17. In another embodiment, no air-conditioning systems are present, in which case the air delivery systems 24, 25 deliver the surrounding (outside) air to the air outflow openings 16, 17.

In the embodiment shown, the front air-conditioning system 24 is arranged in the region of an instrument panel 26 and/or a central console 27 in a known manner. In the embodiment shown, the second air-conditioning system 25 is arranged in the rear region 28 of the motor vehicle 1 below a luggage compartment floor 29 in a stowage space 30.

With the air-conditioning system 24 in the switched-on state, cool or cooled air is delivered, for example, through a cavity 4a in the A pillar 4 via a line 31 to the air outflow opening 16. A pivotable air-guiding element 34, 35 is arranged in a respective housing 32, 33 in which the respective air outflow opening 16, 17 is formed. The respective air-guiding element 34, 35 is generally adjusted automatically, for example by way of an electric drive, in order to set the required air volume flows $L_{m,16}$ and $L_{m,17}$.

Also depicted in FIG. 1 is a further air line 36 which is routed via a sill 37 and a cavity 5a in the B pillar 5 upwardly into the roof frame longitudinal portion 14. A further air line 38 is provided between the two housings 32 and 33.

In the embodiment shown in FIG. 1, the air line 36 is connected to an air volume distribution device 39. It is possible by way of the air volume distribution device 39 for the air volume flow $L_m$ delivered through the air line 36 to be adjusted in such a way that an air partial volume $L_{m,16}$ flows to the air outflow opening 16 and an air partial volume $L_{m,17}$ flows to the air outflow opening 17. It is further possible, for example, for the air delivered through the air line 36 to be deflected completely to the air outflow opening 16 or completely to the air outflow opening 17.

The air-conditioning system 25 located in the cavity or stowage space 30 delivers conditioned air to the air outflow opening 17 via an airline 40 arranged in a cavity 6a in the C pillar 6. Depending on the use of a manually controllable air-conditioning system or a self-regulating automatic air conditioner, interior temperature sensors can be provided in the vehicle interior 41 for uniform cooling and automatic temperature control. The fan of the air-conditioning system 24, 25 can have, for example in dependence on the outside temperature, an adjustable air volume delivery.

In the embodiment shown, seat occupancy sensors 42 and 43 are provided which notify the controller of the respective air-conditioning system 24, 25 via corresponding signals whether a seat is occupied or not.

Figure 2B:
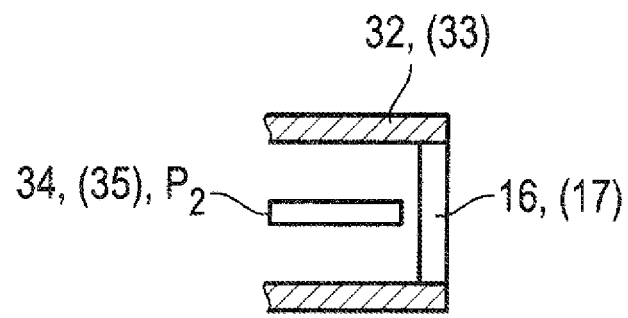
FIG. 2B shows a second position of an air-guiding element in which the air-guiding element is in a horizontal position in which the respective air outlet opening is completely opened, with the result that a maximum air volume can flow out.
Figure 2C:
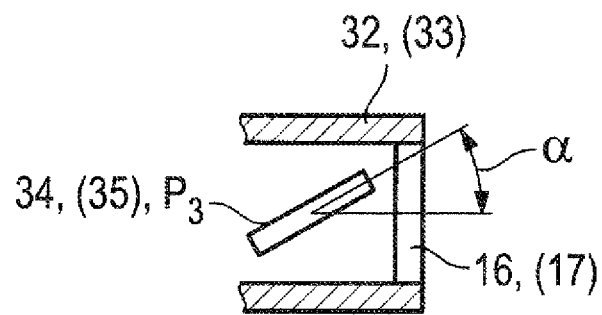
FIG. 2C shows a third position of an air-guiding element, the respective air-guiding element being pivoted upwardly through an angle from the horizontal position shown in FIG. 2B.

FIGS. 2A, 2B and 2C illustrate, by way of example, three different positions of an air-guiding element 34, 35. In one position $P_1$ shown in FIG. 2A, the respective air outlet opening 16, 17 is closed.

In the position of the respective air-guiding element 34, 35 shown in FIG. 2B, the air-guiding element 34, 35 is in a horizontal position $P_2$ in which the respective air outflow opening 16, 17 is completely opened. The result is that a maximum air volume can flow out.

In the position $P_3$ shown in FIG. 2C, the respective air-guiding element 34, 35 is pivoted upwardly through an angle α out of the horizontal position P2 shown in FIG. 2B.

Figure 3:
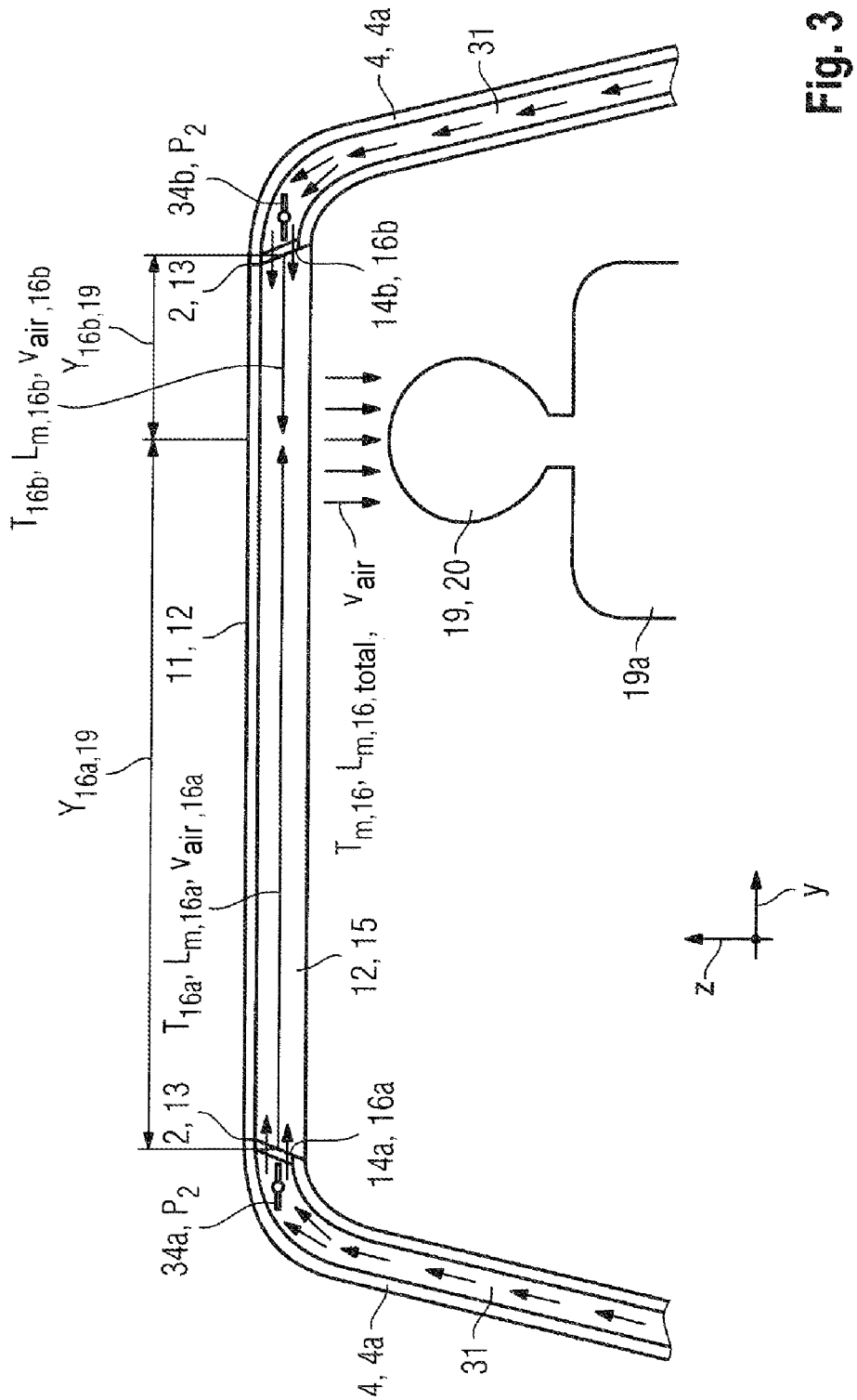
FIG. 3 is a cross-sectional view of a vehicle interior at the height of a single person located on a front seat, with FIG. 3 illustrating the arrangement of air outflow nozzles in the roof frame level with the front seats and the rear seats.

FIG. 3 shows a predetermined setting of the respective air-conditioning system 24, 25 and a predetermined setting of the opposite air-guiding elements 34a, 34b (35a, 35b). By virtue of these settings, when only one seat is occupied by a single person 20 on a front seat 18, for example the driver's seat, a sufficient, cooled total air volume flow $L_{m,16,total}=L_{m,16a}+L_{m,16b}$ flows onto a head 19 and/or an upper body 19a of the person 20. This total air volume flow is composed of the air volume flows $L_{m,16a}$ and $L_{m,16b}$. The two air elements 34a and 34b in FIG. 3 are in the horizontal position P2 shown in FIG. 2B.

In the situation shown in FIG. 3 in which only one person is seated on a predetermined seat, there occurs indirect diffuse impingement upon the head 19 of the person 20 in question corresponding to the different spacing $y_{16a,19} \geq y_{16b,19}$ by two air flows of different intensity. This results in a descending air volume flow directly over the head of the person 19 detected by the corresponding sensor 42, 43.

In one embodiment, two fans are provided which supply the respective air outflow opening 16, 16a (17a, 17b) with air. In another embodiment, only one fan is provided. In this case, throttling devices are present which correspondingly set the air volume flow, with the result that the effect shown in FIG. 3 occurs.

Figure 4:
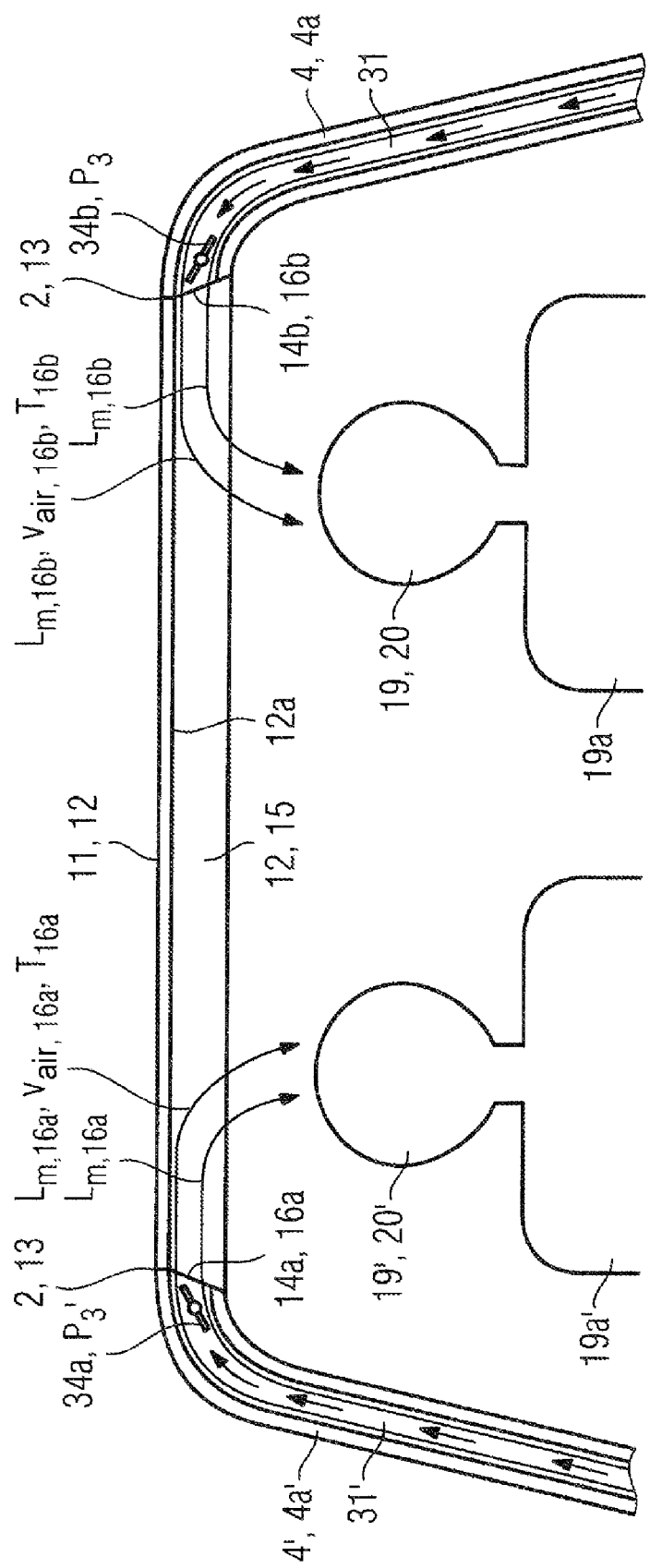
FIG. 4 is a cross-sectional view of a vehicle interior corresponding to FIG. 3, with a person sitting on each of the two front seats.

In FIG. 4, two persons 20, 20' are located on the front seats 18, 18'. The air delivery volume $L_{m,16}$ of the respective air-conditioning system 24, 25 and the air-guiding elements 34a and 34b are adjusted in such a way that a sufficient air volume flows onto the respective head 19, 19' of the respective person 20, 20'.

In FIG. 4, the respective air-guiding element 34a, 34b is in the inclined position $P_3$ shown in FIG. 2C for the air-guiding element 34a. In the inclined position $P_3'$ of the air-guiding element 34b, the air-guiding element 34b is inclined by the same angular degree but in the other direction than is shown in FIG. 2C.

With an occupancy of both front (rear) seats 18 (22) as shown in FIG. 4, the respective air volume outflow must be obtained uniformly. In the embodiment shown, the respective air-guiding elements 34a, 34b are set in the inclined position $P_3$, $P_3'$ in such a way that the air volume flow is directed at a shallow angle onto an inner surface 12a of the transparent roof portion 12.

The air volume flow deflected on the inner surface 12a of the transparent roof portion 12 then flows onto the respective head 19, 19' of the respective person 20, 20'.

The air outflow velocity $v_{air,16}$ or $v_{air,17}$ ranges within a range of $v_{air,16,17}$=0.1 m/s±10%. At this velocity, there does not occur any drying out of the eyes, the mucous membranes and the airways. By virtue of the low air outflow velocity $v_{air,16,17}$, the air outflow openings 16, 16a (17a, 17b) and the lines 31, 36, 38, 40 required therefore can be designed to be small.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a vehicle body forming a passenger cell, the vehicle body including a roof with a roof opening, a floor and body pillars, wherein the body pillars connect the roof to the floor and wherein the roof opening is surrounded by roof frame portions and is filled with a roof portion made of a transparent material;
    at least one air delivery system configured to deliver air into an interior of the vehicle body from surroundings of the vehicle;
    air outflow openings formed on both the right and left sides of the vehicle in some of the roof frame portions, corresponding air outflow openings being provided for each row of seats in the vehicle;
    air lines via which the air delivery system delivers air to at least one of the air outflow openings;
    one or more seat occupancy sensors that detect seat occupancy of seats in the vehicle; and
    a controller configured to adjust the at least one air delivery system of a potential number of air delivery systems that are present such that an air volume flow having a predetermined air outlet velocity and a temperature corresponding to a temperature of surrounding air or, when the air-conditioning system is present, a selectable, cooled temperature, is applied to an upper region of a person located on a seat,
    wherein when only one fan is provided and only one seat of a given row is occupied, via adjustable throttling devices in the two opposite air outflow openings a different air volume flow corresponding to a different spacing exiting the corresponding opposite air outflow openings such that a descending total air volume flow is achieved directly over a head and/or an upper body of the person in the occupied seat, and wherein
    the air outflow velocity is set such that air applied onto a head and/or an upper body of the person located on the seat has a velocity of 0.1 m/s within a tolerance range of ±10%.

2. The motor vehicle according to claim 1, further comprising at least one fan configured to deliver the air volume flow.

3. The motor vehicle according to claim 1, wherein
    the air outflow openings are each formed in a housing,
    each respective housing is provided in a respective longitudinal roof frame portion, and
    at least one air-guiding element is arranged in each respective housing so as to be pivotable via a controllable drive.

4. The motor vehicle according to claim 3, wherein
    in an arrangement with only one fan configured to deliver the air volume flow, the adjustable throttling devices are provided by which the respective air volume flow exiting the respective air outlet opening is adjustable.

5. The motor vehicle according to claim 4, wherein multiple seats are occupied.

6. The motor vehicle according to claim 4, wherein
    when two seats of a respective seat row below corresponding air outlet openings are occupied, in each case an equal air volume flows out of the respective air outflow openings,
    the equal air volume being settable via corresponding setting of the respective air-guiding elements and/or of the air outflow velocity such that the respective air volume in each case descends directly over the head and/or the upper body of the respective person located on a seat with a velocity of at most 0.1 m/s within a tolerance range of ±10%.

7. The motor vehicle according to claim 6, wherein
    the respective air-guiding elements deflect the outflowing air volume in a direction of the roof such that the air volume descends in each case directly over the head and/or the upper body of the respective person located on the seat with a velocity of at most 0.1 m/s within a tolerance range of ±10%.

8. The motor vehicle according to claim 1, wherein
    the one or more seat occupancy sensors are at least one of pressure sensors and seat-belt buckle detectors.

9. A motor vehicle, comprising:
    a vehicle body forming a passenger cell, the vehicle body including a roof with a roof opening, a floor and body pillars, wherein the body pillars connect the roof to the floor and wherein the roof opening is surrounded by roof frame portions and is filled with a roof portion made of a transparent material;

at least one air delivery system configured to deliver air into an interior of the vehicle body from surroundings of the vehicle;

air outflow openings formed on both the right and left sides of the vehicle in some of the roof frame portions, corresponding air outflow openings being provided for each row of seats in the vehicle;

air lines via which the air delivery system delivers air to at least one of the air outflow openings;

one or more seat occupancy sensors that detect seat occupancy of seats in the vehicle; and a controller configured to adjust the at least one air delivery system of a potential number of air delivery systems that are present such that an air volume flow having a predetermined air outlet velocity and a temperature corresponding to a temperature of surrounding air or, when the air-conditioning system is present, a selectable, cooled temperature, is applied to an upper region of a person located on a seat, wherein when two seats of a respective seat row below corresponding air outlet openings are occupied, in each case an equal air volume flows out of the respective air outflow openings, and the equal air volume being settable via corresponding setting of the respective air-guiding elements and/or of the air outflow velocity such that the respective air volume in each case descends directly over the head and/or the upper body of the respective person located on a seat with a velocity of at most 0.1 m/s within a tolerance range of ±10%.

10. The motor vehicle according to claim 9, wherein the air outflow velocity is set such that air applied onto a head and/or an upper body of the person located on the seat has a velocity of 0.1 m/s within a tolerance range of ±10%.

11. The motor vehicle according to claim 9, further comprising at least one fan configured to deliver the air volume flow.

12. The motor vehicle according to claim 9, wherein the air outflow openings are each formed in a housing, each respective housing is provided in a respective longitudinal roof frame portion, and at least one air-guiding element is arranged in each respective housing so as to be pivotable via a controllable drive.

13. The motor vehicle according to claim 12, wherein in an arrangement with only one fan configured to deliver the air volume flow, adjustable throttling devices are provided by which the respective air volume flow exiting the respective air outlet opening is adjustable.

14. The motor vehicle according to claim 13, wherein when only one fan is provided and only one seat is occupied, via the adjustable throttling devices in the two opposite air outflow openings, a different air volume flow corresponding to a different spacing exits the corresponding opposite air outflow openings such that a descending total air volume flow is achieved directly over a head and/or an upper body of the person in the occupied seat.

15. The motor vehicle according to claim 14, wherein the respective air-guiding elements deflect the outflowing air volume in a direction of the roof such that the air volume descends in each case directly over the head and/or the upper body of the respective person located on the seat with a velocity of at most 0.1 m/s within a tolerance range of ±10%.

16. The motor vehicle according to claim 9, wherein the seat occupancy sensors are at least one of pressure sensors and seat-belt buckle detectors.

* * * * *